(12) United States Patent
Futa, Jr.

(10) Patent No.: US 6,195,978 B1
(45) Date of Patent: Mar. 6, 2001

(54) ECOLOGY SYSTEM FOR A GAS TURBINE ENGINE

(75) Inventor: Paul W. Futa, Jr., North Liberty, IN (US)

(73) Assignee: AlliedSignal Inc., Morrristown, NJ (US)

( * ) Notice: Subject to any disclaimer, the term of this patent is extended or adjusted under 35 U.S.C. 154(b) by 0 days.

(21) Appl. No.: 09/361,931

(22) Filed: Jul. 27, 1999

(51) Int. Cl.$^7$ ..................................................... F02G 3/00
(52) U.S. Cl. ...................................................... 60/39.094
(58) Field of Search .......................................... 60/39.094

(56) References Cited

U.S. PATENT DOCUMENTS

| | | | |
|---|---|---|---|
| 2,508,260 | 5/1950 | Holley ........................................ | 60/44 |
| 2,543,366 | 2/1951 | Haworth et al. ........................... | 60/41 |
| 2,551,241 | 5/1951 | Buckland .................................. | 60/44 |
| 2,814,931 | 12/1957 | Johnson ................................. | 60/35.6 |
| 2,846,845 | 8/1958 | Parker ...................................... | 60/39.09 |
| 2,881,827 | 4/1959 | Roche et al. ............................. | 158/36 |
| 3,033,277 | 5/1962 | Cowles et al. ........................ | 158/36.4 |
| 3,103,229 | 9/1963 | Smith ..................................... | 137/107 |
| 3,195,611 | 7/1965 | Tyler ..................................... | 158/36.3 |
| 3,344,602 | 10/1967 | Davies et al. ......................... | 60/39.28 |
| 3,556,444 | 1/1971 | Kopp ..................................... | 244/135 |
| 3,557,764 | 1/1971 | Pinner et al. .......................... | 123/139 |
| 3,575,533 | 4/1971 | Bubula ................................. | 417/182.5 |
| 3,694,594 | 9/1972 | Breed ................................. | 200/61.47 |
| 3,774,394 | 11/1973 | Criffield ............................... | 60/39.09 |
| 3,808,796 | 5/1974 | Spears ................................. | 60/39.09 |
| 3,841,089 | 10/1974 | Clark ..................................... | 60/39.09 |
| 3,901,025 | 8/1975 | Bryerton et al. ..................... | 60/39.09 |
| 4,041,695 | 8/1977 | Harper et al. ........................ | 60/39.02 |
| 4,066,386 | 1/1978 | Johnson et al. ...................... | 417/199 |
| 4,095,418 | 6/1978 | Mansson et al. ..................... | 60/39.09 |
| 4,118,926 | 10/1978 | Curvino et al. ..................... | 60/39.06 |
| 4,132,201 | 1/1979 | Bart ...................................... | 123/139 |
| 4,149,372 | 4/1979 | Gavin et al. ......................... | 60/39.09 |
| 4,206,595 | 6/1980 | Cole ..................................... | 60/39.09 |
| 4,215,549 | 8/1980 | Daeschner ............................ | 60/606 |
| 4,309,156 | 1/1982 | Gonner et al. ...................... | 417/403 |
| 4,423,595 | 1/1984 | McLean ................................ | 60/261 |
| 4,539,809 | * | 9/1985 | Stanley et al. ..................... 60/39.094 |
| 4,671,232 | 6/1987 | Stumpp et al. ...................... | 123/300 |
| 4,719,749 | 1/1988 | Greune et al. ..................... | 60/39.094 |
| 5,010,727 | 4/1991 | Cox ..................................... | 60/39.06 |
| 5,159,808 | 11/1992 | Kast .................................... | 60/39.091 |
| 5,339,636 | 8/1994 | Donnelly et al. .................... | 60/734 |
| 5,465,570 | 11/1995 | Szillat et al. ........................ | 60/39.06 |
| 5,528,897 | 6/1996 | Halin ................................... | 60/39.094 |
| 5,809,771 | 9/1998 | Wernberg .......................... | 60/39.094 |

FOREIGN PATENT DOCUMENTS 1077291   7/1967   (GB) .

* cited by examiner

Primary Examiner—Charles G. Freay
Assistant Examiner—Robert Z. Evora
(74) Attorney, Agent, or Firm—Larry J. Palguta

(57) ABSTRACT

A fuel control system for supplying metered quantities of fuel from a fuel supply (11), through a boost pump (13), a filter (21), a high pressure fuel pump (14), a metering valve (15) and a pressurizing valve (17) to an engine fuel manifold (19) includes an ecology valve (43) which provides a fuel flow path (41, 42, 71, 46, 18) between the pressurizing valve (17) and the engine fuel manifold. The status of the ecology valve (43) is solely determined by the status of the pressurizing valve (17). The ecology valve (43) includes a housing (93, 95, 97) with a piston (61) disposed therein which is reciprocable between two extreme positions. The piston (61) defines, in conjunction with the housing, a variable volume chamber (55) for withdrawing a one piston stroke volume of fuel from the engine fuel manifold when the engine is de-energized and the piston (61) moves from one extreme position to the other thereby purging the fuel manifold of fuel.

18 Claims, 4 Drawing Sheets

ECOLOGY SYSTEM FOR A GAS TURBINE ENGINE

The present invention relates generally to fuel delivery systems for engines, especially aircraft gas turbine engines, and more particularly to an ecology system for such fuel delivery systems.

Some fuel delivery systems for gas turbine engines require an ecology function that removes a set quantity of fuel from the engine fuel manifold after engine shutdown. This is required for two reasons. First, it keeps fuel from vaporizing into the atmosphere. Second, it keeps the fuel from coking on the engine's fuel nozzles, a condition that hinders nozzle performance, leading to premature failure. A costly and complex solution is provided by prior art ecology systems which use a complex arrangement of pistons, check valves, divider valves, plumbing, reservoirs and pumps to accomplish this task, some such features being shown in Cole U.S. Pat. No. 4,206,595 and Wernberg U.S. Pat. No. 5,809,771. This type of architecture results in a high cost and weight ecology system.

It is desirable to minimize the fuel remaining in an engine fuel manifold upon cessation of engine operation and there is a demand for the provision of a compact, economical ecology function for fuel supply systems.

The present invention provides solutions to the above problems by reversing the direction of fuel flow to the engine upon engine shut-off by adding one valve to the main fuel control, and modifying the main fuel control pressurizing valve to include a pressure switching function. The valve has a movable piston defining therein a variable volume chamber and purges the engine fuel manifold by withdrawing a one piston stroke volume of fuel from the conduit coupling the valve to the engine fuel manifold when the engine is de-energized. Separate components, mounting brackets and engine plumbing are eliminated, reducing total system weight and cost.

In accordance with one form the invention, an ecology valve whose position is solely controlled by a pressurizing valve, supplies fuel from the pressurizing valve to the engine fuel manifold during normal engine operation and withdraws fuel from the engine fuel manifold during cessation of engine operation. The ecology valve includes a valve housing with an inlet port coupled to a main fuel flow outlet of the pressurizing valve, an outlet port coupled to the engine fuel manifold, and a control port connected to a control port of the pressurizing valve. The valve contains a movable piston having opposed piston faces. The piston is reciprocable between one position allowing maximum fuel flow from the inlet port to the outlet port, and another position substantially blocking any fuel flow from the inlet port to the outlet port. The piston responds to high pressure at the ecology valve control port to move toward the fuel passing position and to lower pressure at the ecology valve control port, indicative of cessation of engine operation, to move toward the fuel blocking position and, concurrently, to withdraw fuel from the engine fuel manifold. One piston face receives the control inlet pressure and the other face defines, in conjunction with the housing, a variable volume chamber in to which fuel is drawn during engine shut-down.

BRIEF DESCRIPTION OF THE DRAWING

Corresponding reference characters indicate corresponding parts throughout the several views of the drawing.

DESCRIPTION OF THE PREFERRED EMBODIMENT

Figure 1:
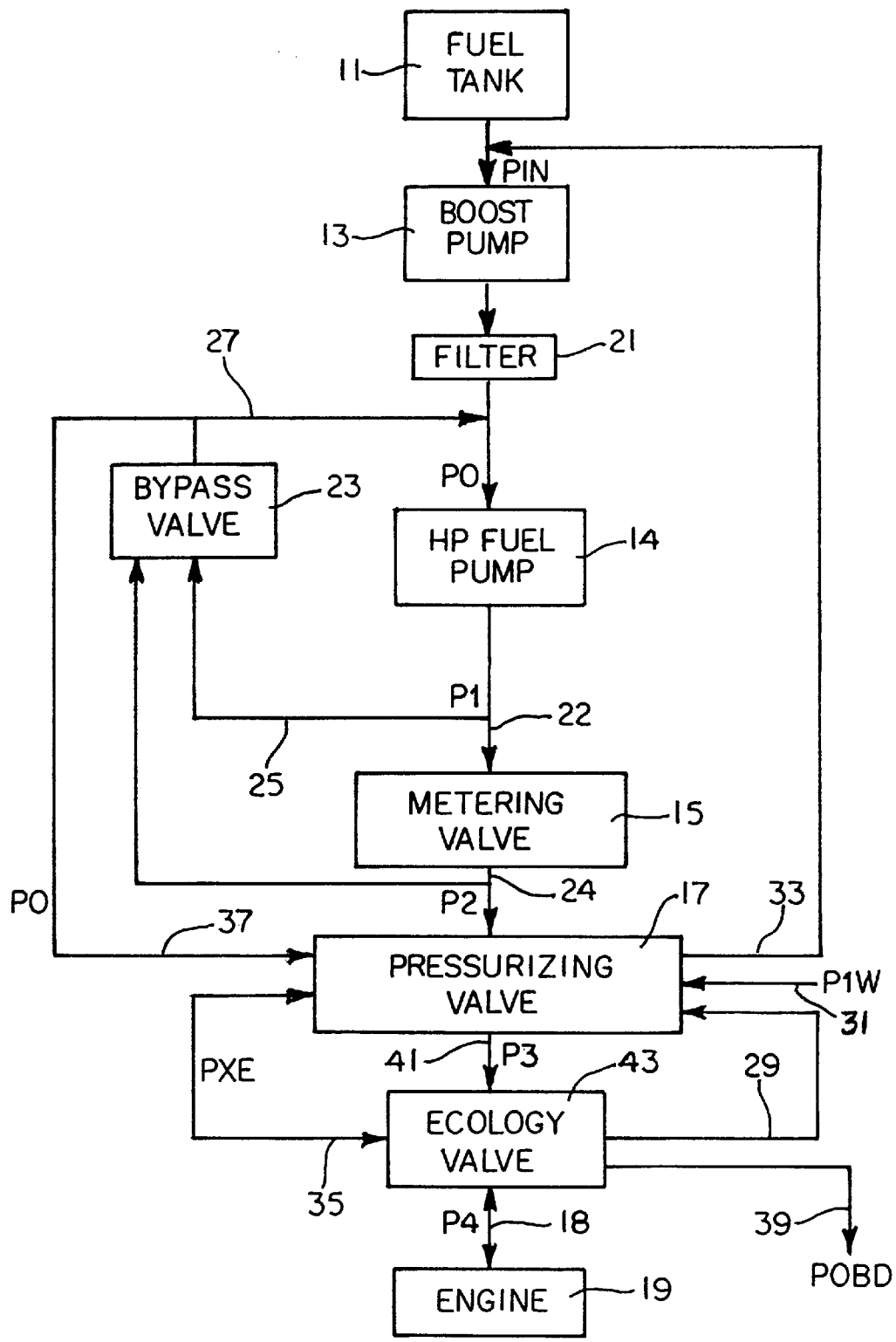
FIG. 1 is a schematic representation of an illustrative aircraft fuel system employing the ecology valve of the present invention.

In FIG. 1, an illustrative aircraft fuel supply system includes a supply tank 11 from which fuel is fed by boost pump 13 and a filter 21 to a high pressure pump 14 to a variable orifice metering valve 15 and through a pressurizing valve 17 to an engine 19. The pressurizing valve 17 maintains a reference pressure level P2 on the downstream side 24 of the metering valve 15 and the bypass valve 23 selectively diverts fuel via line 25 from line 22 back through line 27 to the HP fuel pump 14 inlet to maintain a constant head or pressure drop across the metering valve 15. This post-filter boost pump pressure (P0) is also supplied to the pressurizing valve 17 by lines 27 and 37. Fuel entering the fuel manifold of the engine 19 from pressurizing valve 17 flows through line 41, ecology valve 43 and line 18 to the engine as shown in greater detail in FIGS. 2–4.

Figure 2:
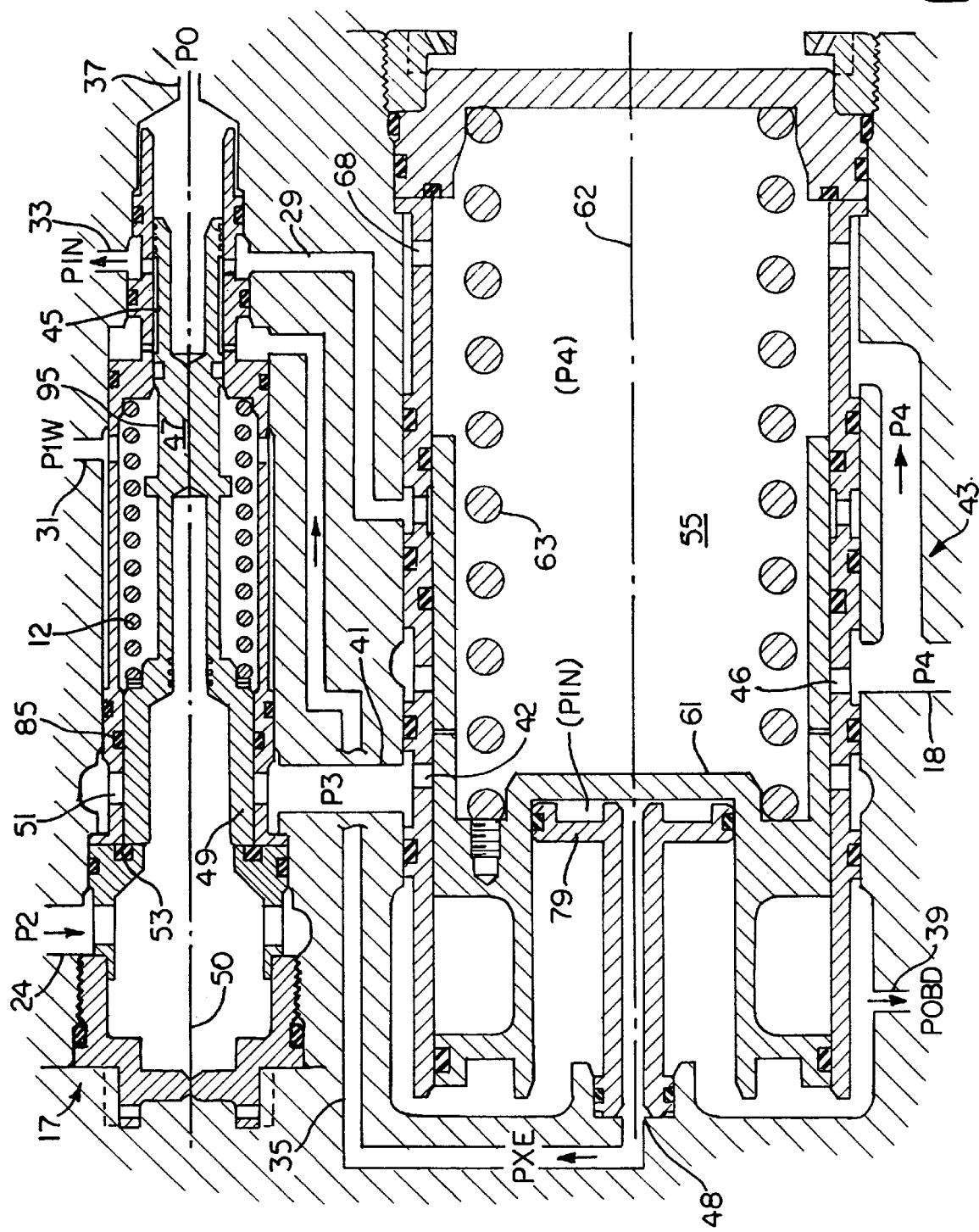
FIG. 2 is a detailed cross-sectional view of the pressurizing valve and ecology valve of FIG. 1.

The pressurizing valve 17 is a somewhat conventional P1W assist pressurizing valve, shown in the closed position in FIG. 2, that has been modified and PXE and PIN grooves or annuli 45 and 95 added to control the position of the down stream ecology valve 43. The pressurizing valve opens when burn flow pressure is sufficiently greater than return flow pressure. The valve 17 opens when the pressure differential between P2 on line 24 and P0 in line 37 becomes sufficiently great and closes when that pressure drops below a certain threshold.

FIG. 2 shows the pressurizing and ecology valves of FIG. 1. Frequently, these components of the fuel supply system do not share a common housing. In FIG. 2, the pressurizing valve 17 is held closed by load spring 12, with its switching function connecting the ecology valve control pressure (PXE pressure) at control port 48 by way of line 35 to fuel control inlet pressure (PIN pressure) at inlet 33 and the annulus 45 in valve piston 47. PIN pressure is supply pressure from a fuel tank, typically from a boost pump within the fuel tank. With the valve spool or piston 47 in this position at the leftmost extreme of its travel, the piston skirt 49 blocks the outlet ports 51 and seals the P2/P3 flow path from line 24 to line 41 using a soft seat 53 and Teflon cap seal 85. The ecology valve 43 is thereby shown in FIG. 2 with the manifold fully purged, retracting a set amount of fuel from the manifold into the spring cavity 55 of the valve 43. This is the engine off position of both valves 17 and 43.

Figure 3:
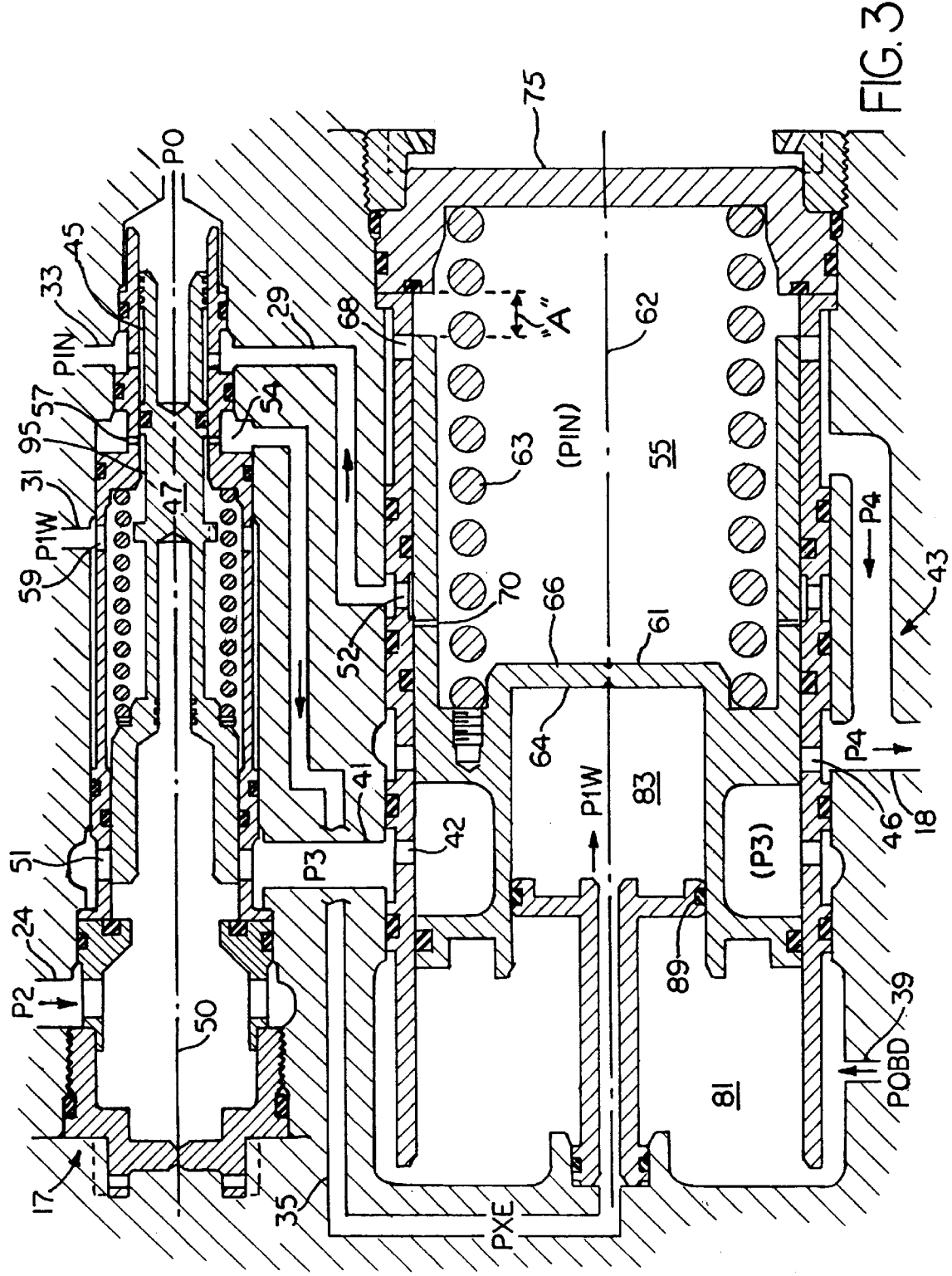
FIG. 3 is a cross-sectional view similar to FIG. 2, but showing the pressurizing valve beginning to open and the ecology valve in its fully energized position.
Figure 4:
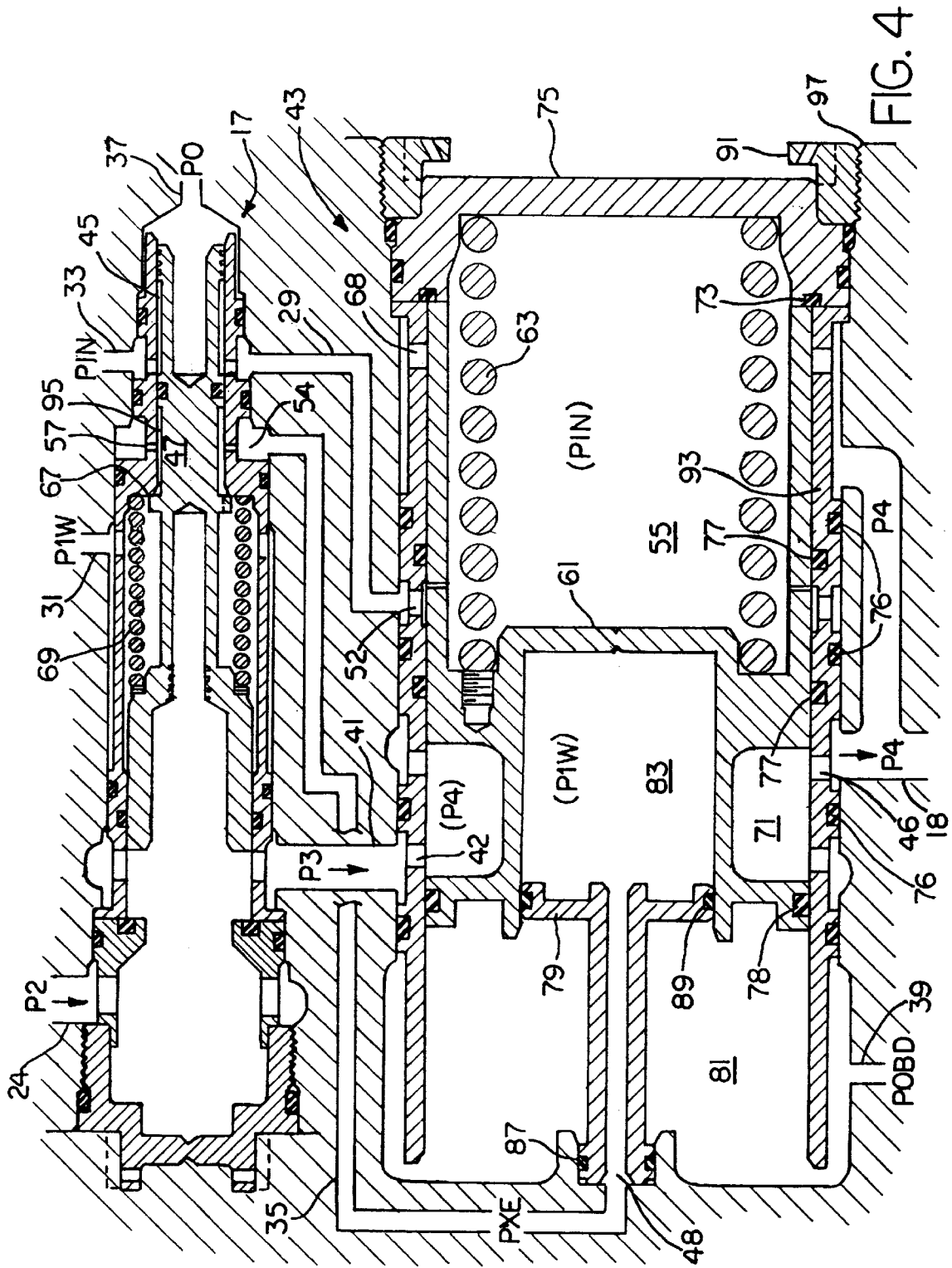
FIG. 4 is a cross-sectional view similar to FIGS. 2 and 3, but showing both the pressurizing valve and the ecology valve in their fully open positions.

In FIG. 3, the spool 47 has moved slightly toward the right along its axis 50 as viewed and the pressurizing valve 17 is at the P2/P3 cracking position, with its switching function connecting PXE pressure in line 35 to the washed servo supply pressure (P1W pressure) from line 31 by way of control port 54, valve housing sidewall apertures such as 57, annulus 95 and housing sidewall apertures such as 59. P1W pressure is essentially the high outlet pressure from pump 14. The ecology valve 43 is shown at its fully energized condition with its piston 61 in rightward position along its axis 62, returning the fuel from chamber 55 on the spring 63 side of the valve piston 61 to the engine fuel manifold and with port 68 blocked by the piston skirt. Piston 61 has a piston face 66 on the spring side and an opposed face 64 which is subjected to control pressure in chamber 83. In this position, sidewall apertures such as 46 are blocked and the P3/P4 flow path remains closed, keeping fuel control pressurization up, and fuel manifold pressure (as well as the pressure in chamber 55 on the spring side of the ecology valve piston) down. A switching function on the ecology valve 43 is also occurring, replacing the ecology valve discharge pressure (P4 pressure) in line 18 with PIN pressure on the spring side of the valve piston 61 from inlet 33 by way of conduit 29, control port 52 and aperture 70. This would be the engine spool up (prior to start) position of the valves. Ecology valve 43 is also at the beginning of flow switching mode "A" through which piston 61 will travel until piston 61 abuts cover 75 as shown in FIG. 4. Flow switching mode "A" provides a portion of piston 61 travel that ends the purge function, performs the P4/PIN pressure switch in cavity 55, and opens the P3/P4 flow path (for scheduled engine burn flow) between line 41 and line 18. This feature also ensures that the ecology valve piston has moved to its fully energized position.

FIG. 4 shows the pressurizing valve 17 with its piston 47 fully opened against its hard stop at 67 and spring 69 at its maximum compression. PXE pressure in line 35 remains connected to P1W pressure in line 31. This holds ecology valve 43 in its full open condition with piston 61 in its rightmost position and spring 63 at its maximum compression. This stationary position of piston 61 ensures that the ecology valve 43 will not have a dynamic affect on fuel flow to the engine during the critical high accuracy phases of engine start-up and normal operating conditions. The main fuel flow path through the ecology valve is from conduit 41, inlet port 42, annulus or chamber 71, outlet port 46 and line 18 to the engine. Valve 43 has opened the P3/P4 flow path from line 41 to line 18. In this position, P4, or burn flow pressure in chamber 71 is isolated from PIN pressure in chamber 55 by a soft seat 73 in the cover 75 and 'O' rings such as 76 and Teflon® cap seals such as 77 in the valve sleeve 93. P4 pressure in chamber 71 is isolated from overboard drain (ambient) pressure (POBD) in chamber 81 by a Teflon® cap seal such as 78. The sleeve 93 is an internal part of the valve housing and is assembled into the valve housing 97 and held therein by cover 75 and spanner 91. FIG. 4 illustrates the maximum flow position for the pressurizing valve 17 and the normal engine starting and running position of the ecology valve 43.

The ecology valve piston 61 position is solely controlled by the pressurizing valve 17 by switching the PXE pressure in line 35 between low (PIN) pressure as in FIG. 2 and high (P1W) pressure as in FIGS. 3 and 4. The stator 79 is held in place initially by the load spring 63, then subsequently by pressure delta or difference between chamber 83 which is at P1W pressure and chamber 81 which is at overboard drain (ambient) pressure (POBD pressure) in line 39. Sealing between chambers 81 and 83 is by 'O' ring 87 and Teflon cap seal 89. Cover 75 is held in place by a spanner 91.

Pressure levels are listed for reference only and are approximately as follows:
POBD=overboard drain pressure (ambient pressure)
PIN=pump inlet pressure (0 to 50 psi above ambient)
P0=pump interstage pressure (5 to 70 psi above PIN)
P1W=washed pump discharge pressure (300 to 1,000 psi above P0)
P2, P3 & P4=metering, pressurizing & ecology valve discharge pressure (0 to 970 psi above P0)

The method of operation of the invention should now be clear. When the pilot or other operator issues a command to shut off the engine, the P2–P0 pressure differential across valve 17 drops and that valve closes (FIG. 4). This connects the control port 48 of the ecology valve to the low pressure PIN by way of line 35, port 54, and annulus 45 in the pressurizing valve piston. Spring 63 drives the piston 61 in a direction to open port 68 and expand the variable volume chamber 55 drawing a piston stroke volume of fuel from the line 18 and both valves assume the FIG. 2 position. When the difference between P2 and P0 exceeds a certain threshold, piston 47 of valve 17 begins to move along its axis 50 and a P1W path is established from line 31 through annulus 95, sidewall port 57, and conduit 35 to the ecology valve. This higher pressure enters cavity 83 forcing piston 61 along its axis 62 expelling the fuel from chamber 55 back to the engine fuel manifold (FIG. 3).

What is claimed is:

1. An ecology valve for supplying fuel from a pressurizing valve to an engine fuel manifold during normal engine operation and for withdrawing fuel from the engine fuel manifold during cessation of engine operation comprising:

a valve housing including an inlet port adapted to be coupled to a main fuel flow outlet of the pressurizing valve, an outlet port adapted to be coupled to the engine fuel manifold, and a control port adapted to be connected to a control port of the pressurizing valve; and a movable piston supported within the valve housing for reciprocable motion along an axis and whose position is controlled solely by the pressurizing valve, the piston having one position allowing maximum flow of fuel from the inlet port to the outlet port, and another position substantially blocking any fuel flow from the inlet port to the outlet port, the piston responding to high pressure at the ecology valve control port to move toward said one position and to lower pressure, indicative of cessation of engine operation, at the ecology valve control port, to move toward said another position.

2. The ecology valve of claim 1, wherein the piston has opposed piston faces, one face receiving control pressure and the other face defining, in conjunction with the valve housing, a variable volume chamber.

3. The ecology valve of claim 2, wherein the valve housing includes a second control port adapted to be connected to a second control port of the pressurizing valve, the second control port normally blocked by the piston in said another position and coupling said lower pressure to the variable volume chamber when in said one position.

4. The ecology valve of claim 2, further comprising spring means within the valve housing engaging and applying a force to the piston to urge the piston toward said another position, the force of the higher control inlet pressure on the piston exceeding said spring force and the force of the lower control inlet pressure on the piston being less than said spring force.

5. The ecology valve of claim 2, further including a sidewall port in the housing closed by the piston when the piston is in said one position and opening upon initial piston movement toward said another position to couple the variable volume chamber with said engine fuel manifold.

6. The ecology valve of claim 2, wherein the valve housing includes a second control port adapted to be connected to a second control port of the pressurizing valve, the second control port normally blocked by the piston in said another position and coupling said lower pressure to the variable volume chamber when in said one position, the second control port being opened by the piston when the piston is in said one position and closing upon initial piston movement toward said another position to disconnect the variable volume chamber from the lower pressure.

7. The ecology valve of claim 6, further comprising spring means within the housing engaging and applying a spring force to the piston to urge the piston toward said another position, the force of the higher control pressure on the piston exceeding said spring force and the force of the lower control pressure on the piston being less than said spring force, and a sidewall port in the housing closed by the piston when the piston is in said one position and opening upon initial piston movement toward said another position to couple the variable volume chamber with said engine fuel manifold whereby, upon the control port pressure dropping from the higher pressure to the lower pressure, the piston moves from the one position toward the another position under spring force urging expanding the variable volume chamber and withdrawing fuel from the engine fuel manifold.

8. The ecology valve of claim 1, wherein the one position of the piston includes a flow switching mode within which piston movement does not affect fuel flow dynamics to the fuel manifold.

9. The ecology valve of claim 8, wherein the piston completes the flow switching mode when the piston ceases stroke travel movement.

10. A fuel control system for supplying metered quantities of fuel from a fuel supply, through a fuel pump, a metering valve and a pressurizing valve to an engine fuel manifold, the improvement comprising:
an ecology valve selectively providing a fuel flow path between the pressurizing valve and the engine fuel manifold and controlled solely by the pressurizing valve, the ecology valve including a housing and a piston disposed therein and movable between first and second positions, the piston defining, in conjunction with the housing, a variable volume chamber for withdrawing a piston stroke volume of fuel from the engine fuel manifold when the engine is de-energized and the piston moves from the first position to the second position thereby purging the fuel manifold of fuel.

11. The improvement of claim 10, wherein the piston and housing provide a fuel flow path from the pressurizing valve to the engine fuel manifold when the chamber is at minimum volume and blocks the fuel flow path from the pressurizing valve to the engine fuel manifold when the chamber is at maximum volume.

12. The improvement of claim 11, wherein piston motion in a direction to increase chamber volume concurrently closes the fuel flow path and withdraws fuel from the engine fuel manifold.

13. The improvement of claim 10, wherein the pressurizing valve includes a main fuel flow inlet, a main fuel flow outlet and a movable piston normally blocking fuel flow from the main fuel flow inlet to the main fuel flow outlet and moving to a position allowing fuel flow from the metering valve through the main fuel flow inlet to the main fuel flow outlet and to the ecology valve when the fuel pressure from the metering valve exceeds a predetermined threshold, the pressurizing valve including a control port for supplying low control fuel pressure to the ecology valve so long as the fuel flow path is blocked and supplying a higher control fuel pressure to the ecology valve when in the position allowing fuel flow to the ecology valve.

14. The improvement of claim 13, wherein the ecology valve has a valve housing including an inlet port coupled to the main fuel flow outlet of the pressurizing valve, an outlet port coupled to the engine fuel manifold, and a control port connected to the control port of the pressurizing valve, the ecology valve piston having one extreme position allowing the flow of fuel from the ecology valve inlet port to the ecology valve outlet port, and another position substantially blocking any fuel flow from the ecology valve inlet port to the ecology valve outlet port, the ecology valve piston responding to high pressure supplied from the pressurizing valve control port to the ecology valve control port to move toward said one position and to lower pressure indicative of cessation of engine operation, at the ecology valve control port, to move toward said another position.

15. The improvement of claim 14, wherein the ecology valve piston and housing provide the fuel flow path from the pressurizing valve to the engine fuel manifold when the chamber is at minimum volume and blocks the fuel flow path from the pressurizing valve to the engine fuel manifold when the chamber is at maximum volume.

16. The improvement of claim 15, wherein ecology valve piston motion in a direction to increase chamber volume concurrently closes the fuel flow path through the ecology valve and withdraws fuel from the engine fuel manifold.

17. The ecology valve of claim 10, wherein the first position of the piston includes a flow switching mode within which piston movement does not affect fuel flow dynamics to the fuel manifold.

18. The ecology valve of claim 17, wherein the piston completes the flow switching mode when the piston ceases stroke travel movement.

* * * * *